US 8,819,733 B2

(12) United States Patent
Crew et al.

(10) Patent No.: US 8,819,733 B2
(45) Date of Patent: *Aug. 26, 2014

(54) PROGRAM SELECTING APPARATUS AND METHOD OF CONTROLLING PROGRAM SELECTING APPARATUS

(75) Inventors: Laurence Crew, New South Wales (AU); Eileen Oi-Yan Mak, New South Wales (AU); Jeonren Vendrig, New South Wales (AU); Ernest Yiu Cheong Wan, New South Wales (AU); Barry James Drake, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,346

(22) Filed: Jun. 22, 2012

(65) Prior Publication Data
US 2012/0266192 A1 Oct. 18, 2012

Related U.S. Application Data

(62) Division of application No. 11/245,120, filed on Oct. 7, 2005, now abandoned.

(30) Foreign Application Priority Data

Nov. 1, 2004 (AU) .............................. 2004906288
Nov. 1, 2004 (AU) .............................. 2004906289

(51) Int. Cl.
*G06F 3/00* (2006.01)
*G06F 13/00* (2006.01)
*H04N 5/445* (2011.01)

(52) U.S. Cl.
USPC .................. 725/40; 725/39; 725/43; 725/45; 725/46; 725/47; 725/52; 725/53; 725/60

(58) Field of Classification Search
USPC ...................................... 725/37–47
See application file for complete search history.

(56) References Cited

U.S. PATENT DOCUMENTS

| 5,940,073 A | 8/1999 | Klosterman et al. |
| 6,704,931 B1 | 3/2004 | Schaffer et al. |

(Continued)

FOREIGN PATENT DOCUMENTS

| CN | 1332927 A | 1/2002 |
| CN | 1513263 A | 7/2004 |
| DE | 4201031 C2 | 9/1994 |
| EP | 1135929 A | 9/2001 |

(Continued)

OTHER PUBLICATIONS

M. Ehrmantraut et al., "The Personal Electronic Program Guide—Towards the Individual Pre-Selection of Individual TV Programs", Proc. of the Intl. Conf. on Information and Knowledge Management, CIKM, ACM, New York, Nov. 12, 1996, pp. 243-250.

(Continued)

*Primary Examiner* — Kunal Langhnoja
(74) *Attorney, Agent, or Firm* — Fitzpatrick, Cella, Harper & Scinto

(57) ABSTRACT

An assistance method for selecting a program using a display device (112) is disclosed. The method (1200) selects one or more attributes associated with a first program, the one or more attributes being selected dynamically by a processor associated with the display device (112) according to one or more predetermined criteria. The method searches for a second program associated with one or more of the selected attributes. The second program and the one or more attributes associated therewith are displayed on the display device, according to the search for the second program.

18 Claims, 14 Drawing Sheets

(56) References Cited

U.S. PATENT DOCUMENTS

| | | |
|---|---|---|
| 6,973,663 B1 | 12/2005 | Brown et al. |
| 8,073,871 B2 | 12/2011 | Gutta et al. |
| 2003/0014404 A1 | 1/2003 | Gutta et al. |
| 2003/0033174 A1 | 2/2003 | Ikeda et al. |
| 2003/0097186 A1 | 5/2003 | Gutta et al. |
| 2003/0135855 A1 | 7/2003 | Faihe |
| 2003/0226146 A1 | 12/2003 | Thurston et al. |
| 2004/0024898 A1 | 2/2004 | Wan |
| 2004/0117402 A1 | 6/2004 | Tateson et al. |
| 2004/0221308 A1* | 11/2004 | Cuttner et al. .......... 725/46 |
| 2005/0097606 A1* | 5/2005 | Scott et al. .......... 725/52 |
| 2007/0136286 A1 | 6/2007 | Webster et al. |

FOREIGN PATENT DOCUMENTS

| | | |
|---|---|---|
| JP | 10-243309 A | 9/1998 |
| JP | 2003-61000 A | 2/2003 |
| WO | 2002-100104 A2 | 12/2002 |
| WO | 2004-034703 A1 | 4/2004 |
| WO | WO 2004/064296 A2 | 7/2004 |

OTHER PUBLICATIONS

Communication issued on Apr. 2, 2013, in counterpart EP application 05256691.6-2202.

Opposition Statement lodged by Interessengemeinschaft für Rundfunkschutzrechte e.V. on Sep. 30, 2013, against European Patent No. 1 653 733 B1 (English translation).

* cited by examiner

PROGRAM SELECTING APPARATUS AND METHOD OF CONTROLLING PROGRAM SELECTING APPARATUS

CROSS-REFERENCE TO RELATED PATENT APPLICATIONS

This is a divisional of application Ser. No. 11/245,120, filed Oct. 7, 2005. It claims benefit of that application under 35 U.S.C. §120 and claims benefit under 35 U.S.C. §119 of Australian Patent Applications Nos. 2004906288 and 2004906289, both filed Nov. 1, 2004. The entire contents of each of the three mentioned prior applications are incorporated herein by reference.

BACKGROUND OF THE INVENTION

Field of the Invention

The present invention relates generally to the fields of multi-media, information technology and computing and, in particular, to a method and apparatus for displaying data associated with a program. The present invention also relates to a computer program product including a computer readable medium having recorded thereon a computer program for displaying data associated with a program.

In recent times, particularly in the areas of multi-media, information technology and computing, people are being exposed to huge amounts of data every day. It is important that a particular person or user of such data is able to navigate through available data items efficiently, in order to determine a subset of data items that is more relevant to the particular user.

Conventionally, there have been two main methods of determining a subset of relevant data items from the available data items. These two main conventional methods may be broadly referred to as "searching" and "browsing". Conventional searching methods require a considerable amount of data, such as keywords, search categories and other search conditions, to be input by a user in order to be effective. These conventional searching methods are inappropriate for certain types of user interfaces, such as television screens and remote controls, where detailed data input is often difficult and inefficient.

For user interfaces such as television screens and remote controls, conventional browsing methods can be more appropriate. In such browsing methods, data items of a collection of data items may be organised into some form of data structure, such as a hierarchy of categories. A user may be provided with mechanisms for browsing through the data structure.

However, conventional browsing methods have a number of disadvantages. For example, conventional browsing methods typically only work well when the number of data items in the collection of data items being browsed is less than a certain size beyond which browsing efficiency starts to decline. Further, conventional browsing methods, which organise data items into a fixed data structure, do not take into account differences in individual preferences between different users, and hence the organisation might not be optimal for the individual users.

Some conventional searching and browsing methods consider user preferences when retrieving a subset of data items from available data items. In such conventional methods, user preferences may be collected either explicitly (e.g., by asking the user directly) or implicitly (e.g., by interpreting user behaviour) or both. The collected user preferences may then be compiled into user profiles. User profiles may be used to determine what data items a particular user prefers. A user profile for a television system, for example, comprises viewing data about a television user, including watched television programs, unwatched television programs, user ratings for rated television programs and other data collected from the user.

Recommendation systems can use user profiles to generate a short list of data items that may be suggested to users. For example, a recommendation system for a television system may be used to rate television programs based on a given user profile. The recommendation system may then produce a list of television programs, sorted in order of likelihood that the user would be interested in the television program. As an example, FIG. 9 shows a recommendation list 905 comprising television program rankings 900 and a list of television programs 901 for recommending to a user.

One major disadvantage of generating recommendations based simply on user profiles is that the intention of a particular user may change from occasion to occasion. A particular type of preferred data item selected by the particular user on one occasion may not necessarily be a preferred type of data item on a different occasion. For example, consider an online shopping catalogue that sells books. On one occasion the user may prefer children's books as gift for a child. On another occasion the same user may prefer documentary books as reference material for their work.

Some conventional searching and browsing methods use current context (e.g. a currently selected data item), to generate options that are related to the current context. However, these current context methods are also insufficient for large collections of data items, where the number of data items in a subset of available data items might be large. This problem may be addressed to some extent by sorting the data items in the subset into recommendation order based on user preferences.

However, again, there are disadvantages to these conventional current context and sorting methods. For example, presenting all related data items as options to the user is inappropriate for certain types of interfaces, such as television screens and remote controls, where navigating through a long list of options is inefficient.

Thus, a need clearly exists for a more efficient method of displaying data associated with a data item, which is suitable for use with interfaces such as televisions and hand held remote controls.

SUMMARY OF INVENTION

It is an object of the present invention to substantially overcome, or at least ameliorate, one or more disadvantages of existing arrangements.

According to a first aspect of the present disclosure, there is provided an assistance method for selecting a program, said method comprising the steps of:

selecting one or more attributes associated with a first program, the one or more attributes being selected dynamically by a processor according to one or more predetermined criteria;

searching for a second program associated with one or more of the selected attributes; and displaying the second program and the one or more attributes associated therewith, on a display device, according to the search for the second program.

According to another aspect of the present disclosure, there is provided an assistance method for selecting a program, said method comprising the steps of:

determining a first search condition according to a predetermined logical process based on a first selected program, the predetermined logical process being executed by a processor associated with the display device;

searching for a second program based on the first search condition; and displaying the second program and data associated therewith, on the display device, according to the search for the second program.

According to still another aspect of the present disclosure, there is provided an apparatus comprising:

selection means for selecting one or more attributes associated with a first program, the one or more attributes being selected dynamically by a processor according to one or more predetermined criteria;

search means for searching for a second program associated with one or more of the selected attributes; and display means for displaying the second program and the one or more attributes associated therewith, on a display device associated with said processor, according to the search for the second program.

According to still another aspect of the present disclosure, there is provided a computer program for making a computer execute an assistance method for selecting a program, said method comprising the steps of:

selecting one or more attributes associated with a first program, the one or more attributes being selected dynamically according to one or more predetermined criteria;

searching for a second program associated with one or more of the selected attributes; and displaying the second program and the one or more attributes associated therewith, according to the search for the second program.

According to still another aspect of the present disclosure, there is provided a computer readable storage medium having a computer program recorded thereon, said computer program being configured for making a computer execute an assistance method for selecting a program, said method comprising the steps of:

selecting one or more attributes associated with a first program, the one or more attributes being selected dynamically according to one or more predetermined criteria;

searching for a second program associated with one or more of the selected attributes; and displaying the second program and the one or more attributes associated therewith, according to the search for the second program.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Figure 1:
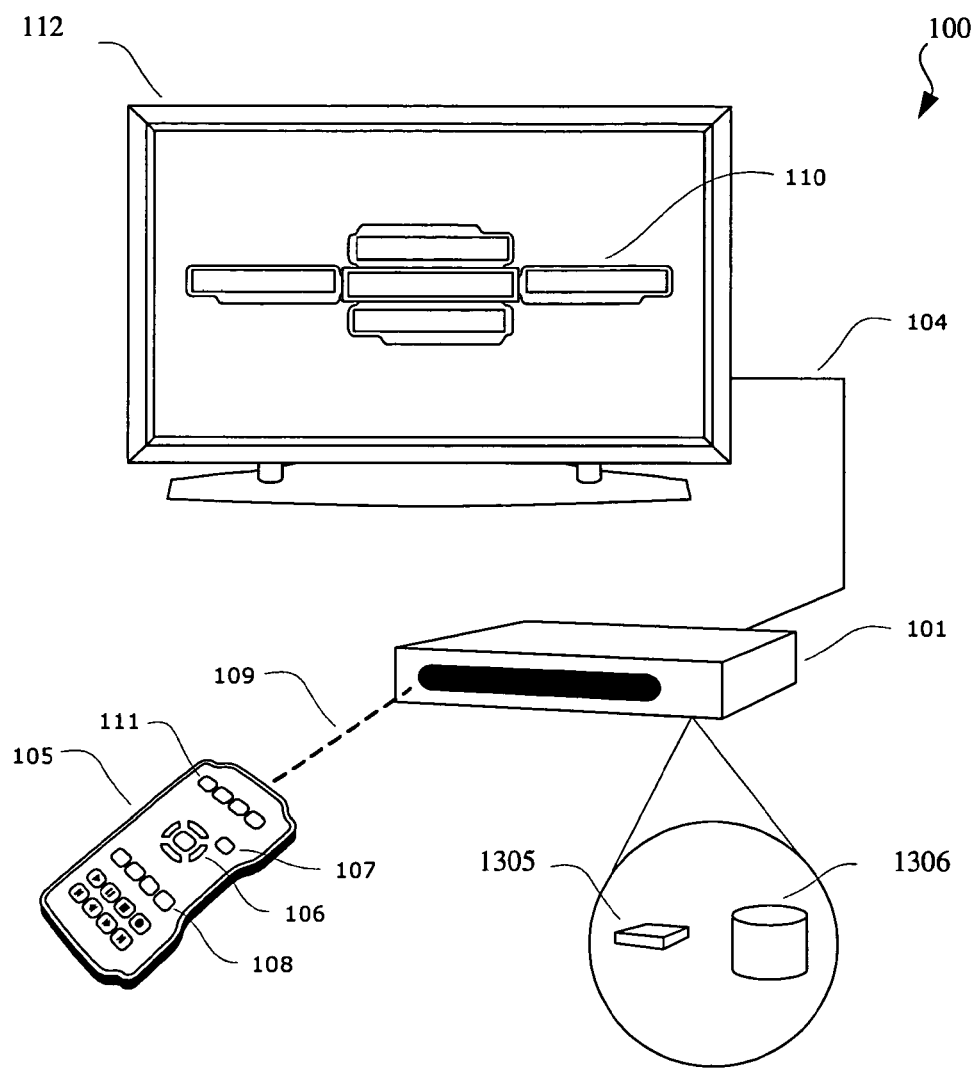
FIG. 1 shows the hardware architecture of a television system.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

The principles of the methods described herein have general applicability to any environment comprising a collection of data items and a user interface for searching on and retrieving data related to selected ones of the data items. However, for ease of explanation, the steps of the methods are described with reference to selection of televisions programs for viewing on a television set and the displaying of data attributes associated with the television programs. It is not intended that the present invention be limited to the described methods. For example, the described methods may have application to an online shopping catalogue a digital photo album or the like.

FIG. 1 shows the hardware architecture of a television system 100 upon which the methods described may be practiced. The system 100 comprises a set top-box 101 coupled to a display device in the form of a television set 112 (e.g., a digital television set). The system 100 also comprises a controller in the form of remote control unit 105, which may be configured for selecting a data item corresponding to a television program for display on the television set 112. As seen in FIG. 1, the remote control unit 105 comprises directional navigation buttons 106 and special function buttons 107, 108 and 111. The buttons 106, 107, 108 and 111 of the remote control unit 104 may take any form. For example, one or more of the buttons 106, 107, 108 and 111 may be in the form of a defined area printed or formed on a surface of the remote control unit 105 and which is selectable by a user in a similar manner to the buttons 106, 107, 108 and 111 shown in FIG. 1. The remote control unit 105 may also take the form of a smart card (not shown) and smart card reader (not shown), where the smart card has a number of user selectable indicia (or areas) formed on a surface thereof. In this instance, the user selectable indicia may be arranged on the surface of the smartcard in a similar manner to the buttons 106, 107, 108 and 111 of the remote control unit 105.

The set-top-box 101 may be used to interpret signals 109 received from the remote control unit 105 according to a press or selection of one or more of the buttons 106, 107, 108 and 111 of the remote control unit 105, permitting control events to occur within the system 100. These control events may result in changes to the state of the system 100 and/or appropriate reproduction on the television set 112, as will be described below.

In the system 100, the remote control unit 105 may use a radio frequency or infra-red (IR) transceiver (not shown) to transmit the signals 109 to the set-top-box 101. Alternatively, the remote control unit 101 may be hard wired to the set-top-box 101, via a communications cable (not shown). Similarly, the set-top-box 101 is shown in FIG. 1 coupled to the television screen 112, via a communications cable 104. Alternatively, instead of being hardwired, a further radio frequency or IR transceiver 1308 (see FIG. 13) may be used for communication between the set-top-box 101 and the television set 112.

Figure 13:
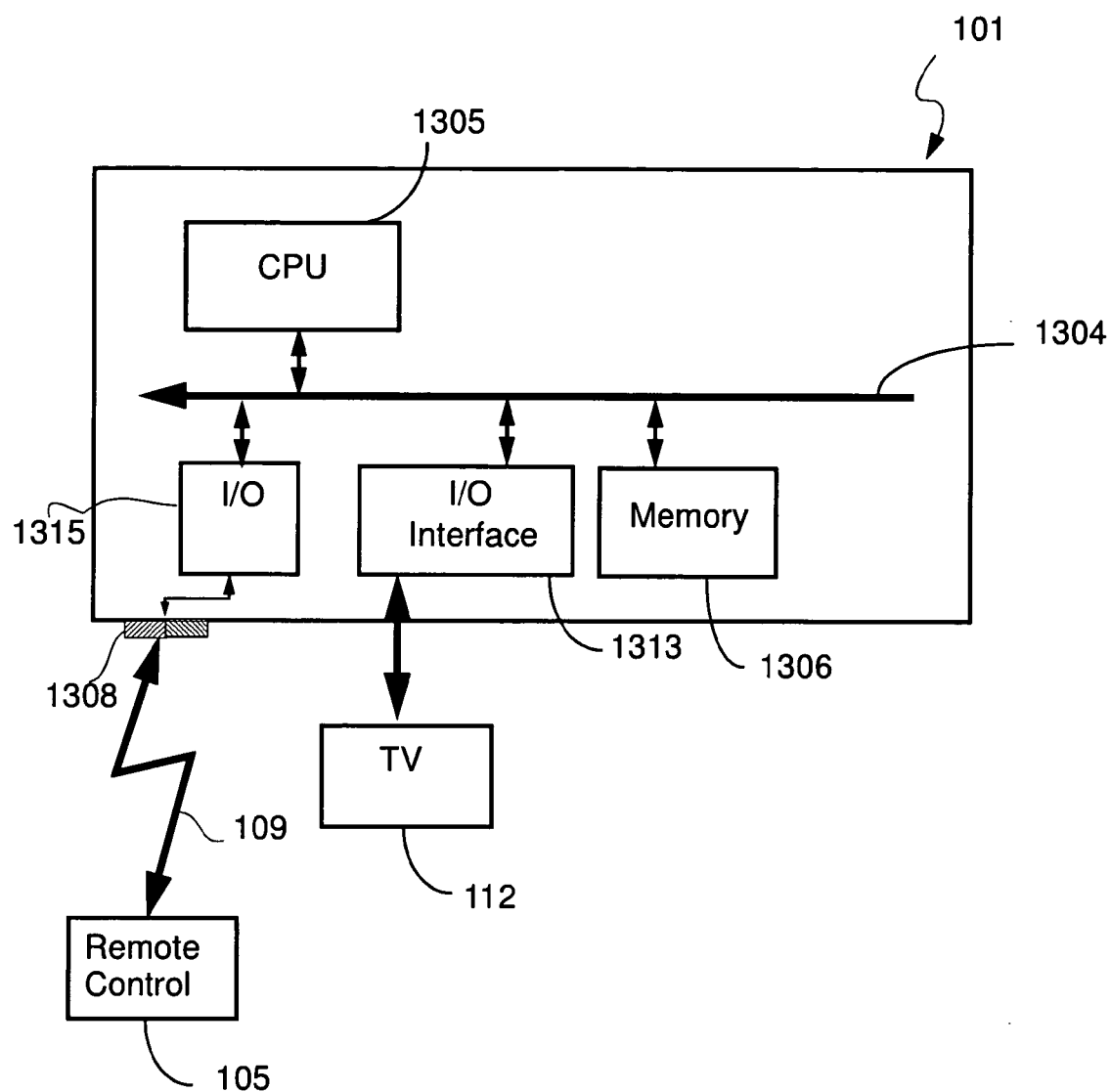
FIG. 13 is a schematic block diagram showing the internal configuration of the set-top-box of FIG. 1.
Figure 14:
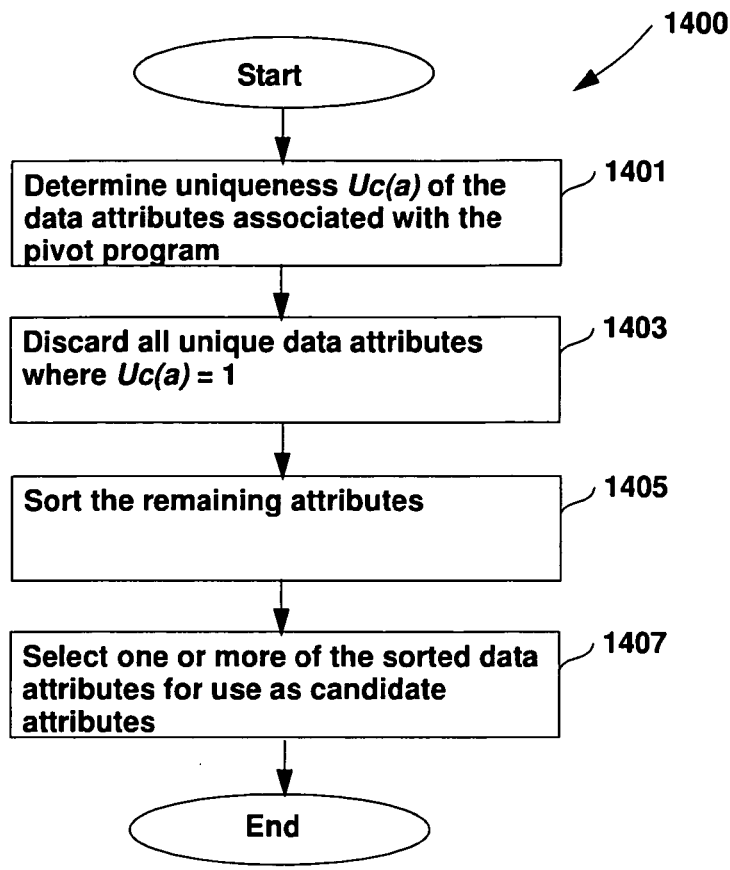
FIG. 14 is a flow diagram showing a method of selecting one or more data attributes associated with a current pivot program for use as candidate attributes, as executed during the method of FIG. 11.

FIG. 13 shows the set top box 101 of the system 100 in more detail. The set top box 101 in some implementations is essentially a scaled version of a conventional computer system. Such computer systems may include IBM-PC's and compatibles, Sun Sparcstations or alike computer systems evolved therefrom.

The set top box 101 typically comprises at least one Central Processing Unit (CPU) 1305, a memory unit 1306, for example, formed from semiconductor random access memory (RAM) and read only memory (ROM). The CPU 1305 may also be referred to as a 'processor'. The set top box 101 also comprises input/output (I/O) interfaces including at least an I/O interface 1313 for transmitting data to and from the television set 112. The I/O interface 1313 may also be used to transmits data to and from another device such as a portable floppy disk drive, CD-ROM drive or even to and from a communications network (e.g., the Internet). The input/output (I/O) interfaces of the set top box 101 typically also includes an I/O interface 1315 for the IR transceiver 1308. The IR transceiver 1308 may be configured for receiving and transmitting the signals 109. The components 1305, 1306, 1308, 1313 and 1315 of the set top box 101 typically communicate via an interconnected bus 1304 and in a manner which results in a conventional mode of operation. Intermediate storage of any data received from the remote control unit 105 may be accomplished using the semiconductor memory 1306. Alternatively, the components 1305, 1306, 1308, 1313 and 1315 of the set top box 101 may be configured within the television set 112.

Software programs implementing the methods described herein may be resident in memory 1306 and be read and controlled in their execution by the CPU 1305 of the set top box 101. Intermediate storage of the software programs may be accomplished using the semiconductor memory 1306, possibly in concert with the CPU 1305. In some instances, the software programs may be supplied encoded on a CD-ROM or floppy disk and downloaded to memory 1306 via the I/O interface 1313. Still further, the software programs may also be loaded into memory 1306 from other computer readable storage mediums including magnetic tape, ROM or integrated circuits, a magneto-optical disk, a radio or infra-red transmission channel between the set-top-box 101 and another device, a computer readable card such as a smart card, a computer PCMCIA card, the TV broadcast, and the Internet and Intranets including via email transmissions of information recorded on Websites and the like. The foregoing is merely exemplary of relevant computer readable media. Other computer readable storage media are able to be practised without departing from the scope of the invention defined by the appended claims.

The methods described herein may alternatively be implemented in dedicated hardware such as one or more integrated circuits performing the functions or sub functions of the described methods. Such dedicated hardware may include graphic processors, digital signal processors, or one or more microprocessors and associated memories.

In the system 100, the memory unit 1306 contains a plurality of data items stored therein. Each of the data items corresponds to a television program that is currently being broadcast or which may be broadcast at some future time. Each data item may comprise a metadata set describing the name of a corresponding television program, broadcast details such as channel and time of broadcast of the corresponding television program, and/or data values corresponding to various data attributes (e.g., genre, cast, director, awards, producer, series, studio etc) associated with the corresponding television program.

The television set 112 is shown in FIG. 1 displaying a user interface 110. The user interface 110 is rendered by the CPU 1305 in accordance with the methods described herein and transmitted to the television set 112 via the communications cable 104. The user interface 110 may be overlaid on top of any live video stream being displayed on the television set 112. The signals 109 transmitted by the remote control unit 105 are received by the CPU 1305, which may cause changes to the user interface 110 as described in more detail below, depending upon which of the buttons 105, 106, 107 and 111 are selected.

Figure 2:
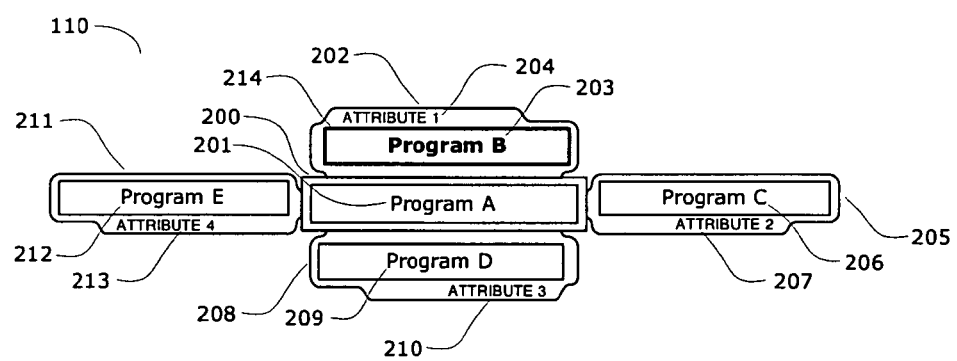
FIG. 2 shows the user interface of FIG. 1.

FIG. 2 shows the user interface 110 in more detail. The user interface 110 comprises a central region 200 surrounded by a plurality of satellite regions 202, 205, 208 and 211 in a predetermined spatial arrangement. The central region 200 contains a television program name 201 corresponding to a particular television program stored in memory 1306. The television program corresponding to the television program name 201 shown in the central region 200 may be referred to as the 'pivot program'.

Each of the satellite regions 202, 205, 208 and 211 also contain a television program name 203, 206, 209 and 212, respectively, in addition to an attribute name 204, 207, 210 and 213. The television program names 203, 206, 209 and 212 represent television programs, which are associated with the pivot program 201 through sharing a similar value of one or more data attributes (e.g., genre, cast, director, awards, producer, series, studio etc). The data attributes through which the television programs represented by the television program names 203, 206, 209 and 212 are associated with the pivot program 201 may be shown as the attribute names 204, 207, 210 and 213, respectively, in each of the satellite regions 202, 205, 208 and 211. Therefore, the attribute names 204, 207, 210 and 213 shown in each satellite region 202, 205, 208 and 211 indicate to a user of the system 100 the association between the television program represented in each of the satellite regions 202, 205, 208 and 211, respectively, and the pivot program 201.

Figure 12:
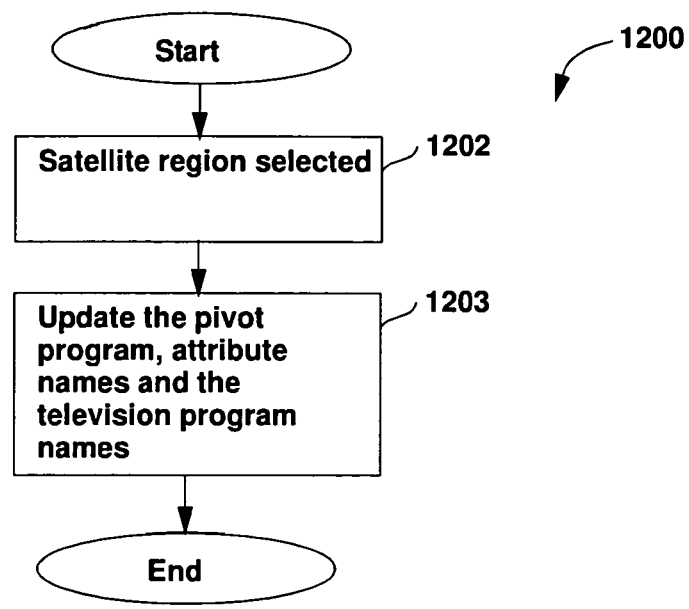
FIG. 12 is a flow diagram showing a method of displaying data attributes associated with a selected television program, using the user interface of FIG. 2.

FIG. 12 is a flow diagram showing a method 1200 of displaying data attributes associated with a selected data item corresponding to a television program (e.g., Program B), using the user interface 110. The method 1200 may be implemented as software resident in memory 1306 and being controlled in its execution by the CPU 1305.

The method 1200 begins at the first step 1202, where the CPU 1305 detects the selection of one of the satellite regions 202, 205, 208 and 211 of the user interface 110, representing a first data item corresponding to a television program (e.g., Program B). The satellite regions 202, 205, 208 and 211 may be selected using the buttons 105, 106, 107, 108 and 111 of the remote control unit 105. In response to one of the satellite regions 202, 205, 208 and 211 being selected using the remote control unit 105, at the next step 1203, the CPU 1305 updates the pivot program 201 displayed in the central region 200 with the television program name (e.g., 203) corresponding to the first data item in the selected satellite region, as will be described in more detail below. Also at step 1203, the CPU 1305 updates each of the satellite regions 202, 205, 208 and 211 to display corresponding second data items based on a search of the memory unit 1306. Each of the second data items represents a new television program which is associated with the updated pivot program 201. The attribute names 204, 207, 210 and 213 of each of the satellite regions 202, 205, 208 and 211 are also updated when the pivot program 201 is updated at step 1203. The updated attribute names 204, 207, 210 and 213 are indicative of the association between the new television program (i.e., second data item) represented by an associated television program name (e.g., 203) in each of the satellite regions 202, 205, 208 and 211 and the updated pivot program 201. The method 1200 concludes following step 1203.

The method 1200 may be used to display data attributes associated with the television programs contained in the memory unit 1306 until such time as a suitable television program is found for viewing, recording or other action.

The steps of the method 1200 may be repeated in response to one of the satellite regions 202, 205, 208 and 211 again being selected using the remote control unit 105. In this instance, the CPU 1305 again updates the pivot program 201 displayed in the central region 200 with the television program name (e.g., 203) corresponding to the second data item in the selected satellite region, as will be described in more detail below. The CPU 1305 also updates each of the satellite regions 202, 205, 208 and 211 to display corresponding third data items based on a search of the memory unit 1306. Each of the third data items represents a new television program which is associated with the updated pivot program 201.

As seen in FIG. 2, a visual highlight indicator 214 of the satellite region 202 may be used to represent that the television program name 203 shown in the satellite region 202 has been selected and is pending an action being applied to the television program represented by the television program name 203. The pending action may be that the program name 203 is to be used to update the pivot program 201 (i.e., the program name 203 becomes the new pivot program 201). A bold typeface may be used to distinguish the selected television program name 203 from the non-selected program names 206, 209 and 212.

Figure 3:
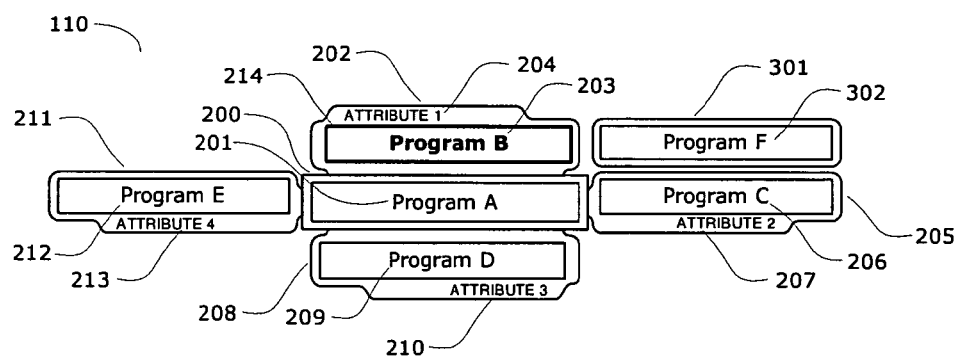
FIG. 3 shows the user interface of FIG. 2 comprising an additional satellite region containing an additional television program name.

FIG. 3 shows the user interface 110 of FIG. 2 comprising an additional region 301 containing an additional television program name 302. The additional region 301 enables the selection of a new pivot program 201 other than through the sharing with another television program (i.e., represented by another television program name) of one or more similar data attributes. As an example, the additional television program name 302 of the additional region 301 may represent a least related television program to the pivot program 201, enabling a user of the system 100 to make a 'wildcard' selection. The additional television program name 302 of the user interface 110 of FIG. 3 allows a quick search for a television program that is dissimilar to a current pivot program 201 (i.e., the television program name currently being displayed in the central region 200). The additional region 301 may be used in the case that the selection of the satellite regions 202, 205, 208 and 211 and the display of the television programs related to the selected satellite regions 202, 205, 208 and 211, as described above, is not leading the user in a direction of interest.

In another example, the television program name 302 of the additional region 301 may be a most highly recommended television program that is dissimilar to the pivot program 201. Alternatively, the television program name 302 of the additional region 301 may be a randomly selected television program that is dissimilar to the pivot program 201.

Figure 4A:
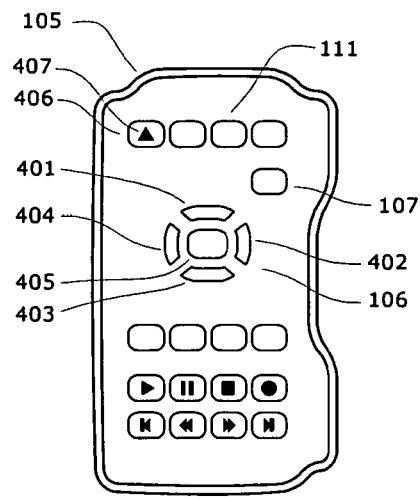
FIG. 4A shows the remote control unit of FIG. 1 comprising directional buttons.
Figure 4B:
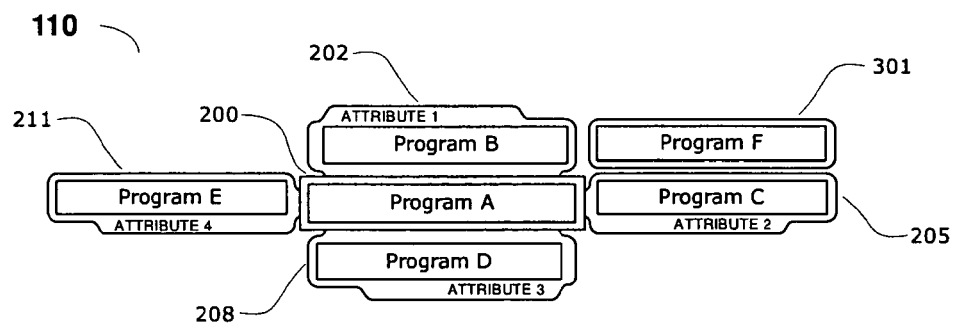
FIG. 4B shows the user interface of FIG. 3 and the relationship between the satellite regions of the user interface and the directional buttons of the remote control unit.

FIGS. 4A and 4B show the remote control unit 105 together with the user interface 110 of FIG. 3. As seen in FIG. 4A, the remote control unit 105 has special function buttons 111 of which one button 406 is configured for launching the user interface 110 of FIG. 4B. An icon 407, as seen in FIG. 4A, indicates the function of the button 406.

The directional buttons 106 comprise an 'up' directional button 401, a 'right' directional button 402, a 'down' directional button 403, a 'left' directional button 404 and a central button 405. The spatial arrangement of the satellite regions 202, 205, 208 and 211 of the user interface 110 of FIG. 4B corresponds to the spatial arrangement of the directional buttons 401, 402, 403 and 404, respectively. Similarly the central region 200 of the user interface 110 corresponds to the central button 405 of the remote control unit 105. The arrangement of the remote control unit 105 and the user interface 110 allows the user to easily understand the mapping between the directional buttons 401, 402, 403 and 404 of the remote control unit 105 and the corresponding satellite regions 202, 205, 208 and 211 of the user interface 110.

Figure 5A:
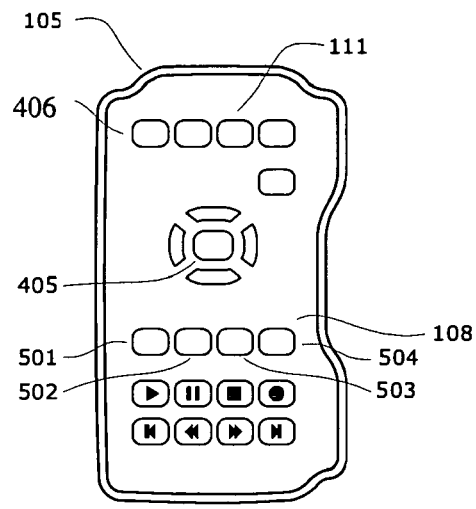
FIG. 5A again shows the remote control unit of FIG. 1.
Figure 5B:
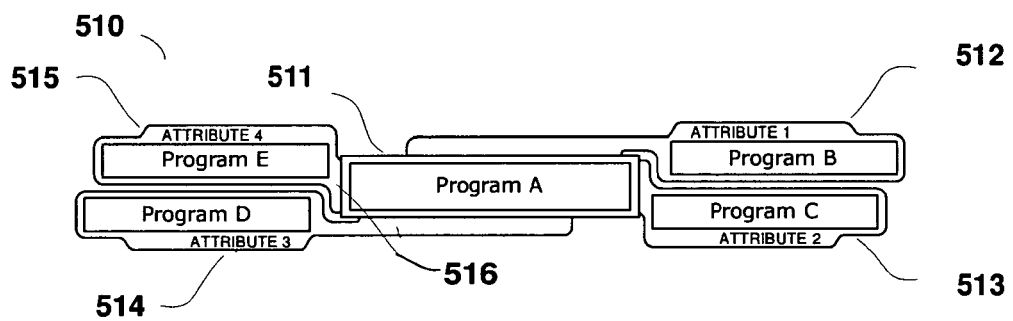
FIG. 5B shows another user interface and the relationship between the satellite regions of this user interface and the remote control unit of FIG. 5A.

FIGS. 5A and 5B show the remote control unit 105 together with another user interface 510. The user interface 510 includes a central region 511 and satellite regions 512, 513, 514 and 515. As seen in FIG. 5B, the regions 511, 512, 513, 514 and 515 do not directly map to the spatial arrangement of the directional buttons 401, 402, 403 and 406 of the remote control unit 105. For the user interface 510, visual indicators (e.g., 516) within each of the regions 512, 513, 514 and 515 may be used to visually link the regions 512, 513, 514 and 515 with the directional buttons 401, 402, 403 and 404 on the remote control unit 105. The arrangement of the user interface 510 reduces the amount of vertical space required to display the user interface 510 on the television set 112, for example.

Figure 5C:
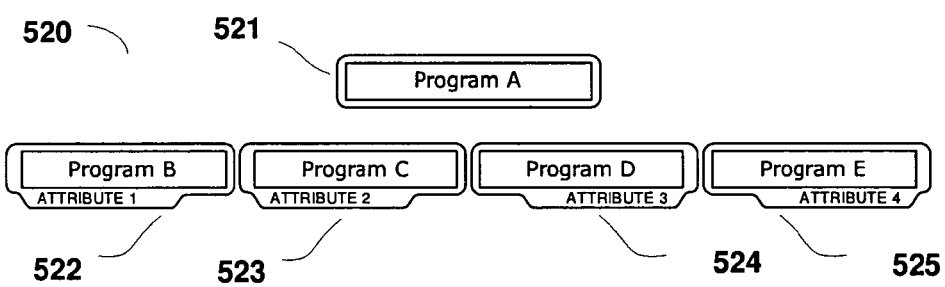
FIG. 5C shows still another user interface and the relationship between linearly arranged satellite regions of this user interface and the remote control unit of FIG. 5A.

FIG. 5C shows still another user interface 520. The user interface 520 includes regions 521, 522, 523, 524 and 525. The regions 522, 523, 524 and 525 are arranged in a linear sequence rather than as satellites of the region 521 which contains the pivot program (e.g., the pivot program 201). As seen in FIG. 5B, the regions 522, 523, 524 and 525 map to the spatial arrangement of the special function buttons 108 (i.e., function buttons 501, 502, 503 and 504) of the remote control unit 105. For the user interface 520, the regions 522, 523, 524 and 525 may be selected using the function buttons 501, 502, 503 and 504, respectively, without using the directional buttons 401, 402, 403 and 404 of the remote control unit 105.

Figure 6:
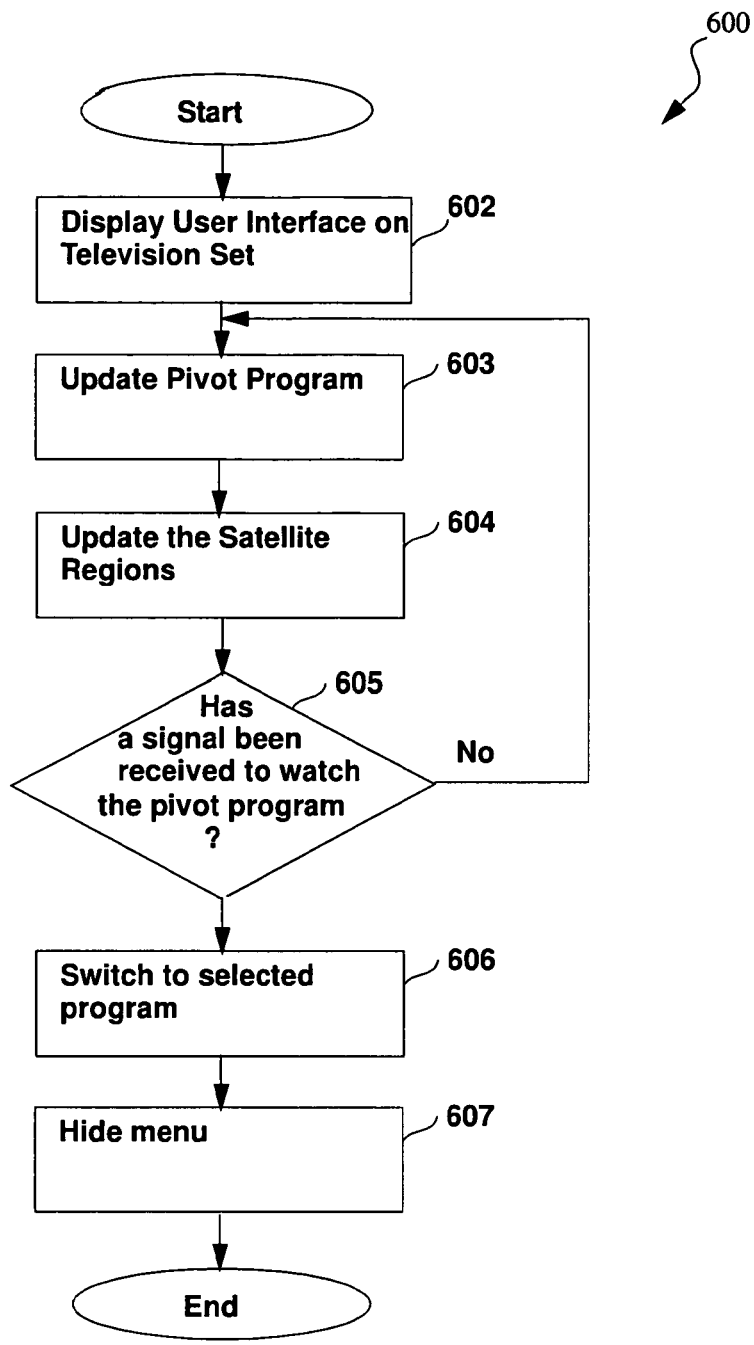
FIG. 6 is a flow diagram showing a method of selecting a television program using the remote control unit of FIG. 4A and the user interface of FIG. 4B.

FIG. 6 is a flow diagram showing a method 600 of selecting a television program using the remote control unit 105 of FIG. 4A and the user interface 110 of FIG. 4B. The method 600 may be implemented as software resident in memory 1306 of the set-top-box 101 and being controlled in its execution by the CPU 1305. A period of execution of the method 600 between the beginning of step 602 and completion of step 607, as described below, will be referred to as a "browsing session".

The method 600 begins at the first step 602, where in response to the detection of a signal received from the remote control unit 105, the CPU 1305 renders the user interface 110 and transmits the rendered user interface 110 to the television set 112 where the user interface 110 is displayed. The signal may be transmitted by the remote control unit 105 at step 602 in response to a user selecting the function button 406, for example. In rendering the user interface 110 at step 602, the CPU 1305 renders the name of a television program in the central region 200. The television program rendered in the central region 200 may be the television program that the user is currently watching. This television program is the initial pivot program 201. The user interface 110 may be overlaid on top of live video of the television program currently being watched on the television set 112.

Alternatively, the initial pivot program 201 may be a television program that the user selected from an electronic program guide, for example. At step 602, the CPU 1305 also renders the name of a television program in each of the satellite regions 202, 205, 208 and 211 in addition to an attribute name 204, 207, 210 and 213, respectively. Each of the television program names (e.g., 203) in each of the satellite regions 202, 205, 208 and 211 of the user interface 110 represent television programs related to the initial pivot program 201 through the sharing of a similar value of one or more data attributes, such as genre, cast, director, awards, producer, series, cast and studio, for example. One of these or other data attributes is shown as the attribute name 204, 207, 210 and 213 in each of the satellite regions 202, 205, 208 and 211. The television program names and data attributes rendered in each of the satellite regions 202, 205, 208 and 211 at step 602 may be selected by the CPU 1305 from the memory 1306 of the set-top-box 101.

At the next step 603, in response to the detection of another signal received from the remote control unit 105, and representing the selection of one of the satellite regions (e.g., 202), the CPU 1305 updates the pivot program 201. The CPU 1305 updates the pivot program 201 at step 603 by replacing the initial pivot program 201 with the name of the television program (e.g., Program B) that was represented by the selected satellite region such that the television program of the selected satellite region becomes the current pivot program 201. Alternatively, the satellite region selected at step 603 may be highlighted by the CPU 1305 using the visual highlight indicator 214 described above in response to the detection of the signal from the remote control unit 105. In this instance, the CPU 1305 may update the initial pivot program 201 upon reception of another signal from the remote control 105. This other signal may be transmitted by the remote control unit 105 in response to the selection of the central button 405, for example.

In one example, a particular one of the television program names 203, 206, 209 and 212 of the user interface 110 may be used to update the initial pivot program 201, at step 603.

Other actions may also be performed at step 603 upon selection of the satellite region such as scheduling the recording of the television program represented by the selected satellite region (e.g., 202). These other actions may be executed upon selection of one or more of the function buttons 107, 108 and 111 of the remote control unit 105, for example.

The method 600 continues at the next step 604, where the CPU 1305 updates the television program names 203, 206, 209 and 212 and attribute names 204, 207, 210 and 213, in each of the satellite regions 202, 205, 208 and 211, respectively, to represent television programs related to the current pivot program 201. Again, the television program names and data attributes rendered in each of the satellite regions 202, 205, 208 and 211 at step 604 may be selected by the CPU 1305 from the memory 1306 of the set-top-box 101. In one example, a particular television program name may be selected and used to update the television program names 203, 206, 209 and 212 of the satellite regions 202, 205, 208 and 211, at step 604, only if the particular television program name has not been the pivot program 201 in the same browsing session. Alternatively, one or more of the television program names selected at step 604 may have been the pivot program 201 in the current browsing session. In still another example, a particular television program name may be selected and used to update the television program names 203, 206, 209 and 212 of the satellite regions 202, 205, 208 and 211, at step 604, only if the particular television program was not the pivot program immediately prior to the current pivot program 201 in the same browsing session.

Figure 7:
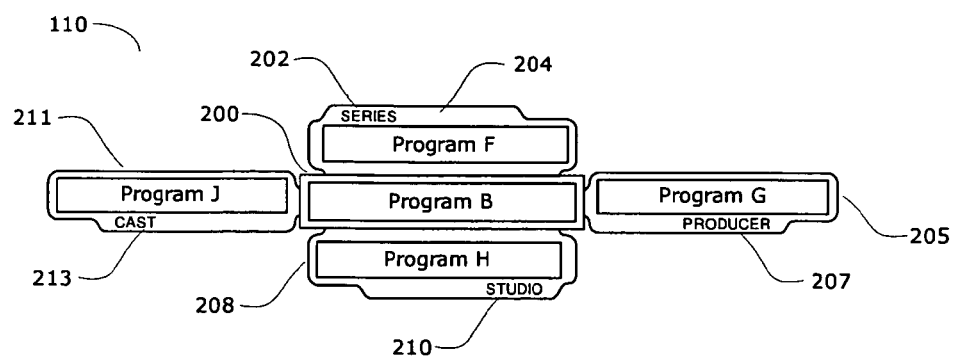
FIG. 7 shows the user interface of FIG. 2, following update of the pivot program and the satellite regions.

As an example, FIG. 7 shows the user interface 110 of FIG. 2, following update of the pivot program 201 in the central region 200, and following update of each of the satellite regions 202, 205, 210 and 213. For the user interface 110 of FIG. 2, 'Program A' is the current pivot program 201 and is shown rendered in the central region 200. 'Program B', 'Program C', 'Program D' and 'Program E' are shown rendered in the satellite regions 202, 205, 210 and 213, respectively, as television programs being associated with the current pivot program 201 through the sharing of a similar value for one of the attributes—'ATTRIBUTE 1' 204, 'ATTRIBUTE 2' 207, 'ATTRIBUTE 3' 210 and 'ATTRIBUTE 4' 213, respectively). In the example of FIG. 7, the satellite region 202 representing Program B is selected by the user using the directional buttons 401, 402, 403, 404 and 405, for example. Selection of the satellite region 202 initiates the transition of the user interface 110 from the state shown in FIG. 2 to the state of the user interface 110 shown in FIG. 7. For the user interface 110 of FIG. 7, Program B becomes the current pivot program 201 and is shown in the central region 200 of the user interface 110. Program F, Program G, Program H, and Program J are shown in each of the satellite regions 202, 205, 206 and 207 indicating an association with the current pivot program 201 through sharing one or more similar values of the attributes 'Series' 204, 'Producer' 207, 'Studio' 210 and 'Cast' 213, respectively.

The method 600 continues at the next step 605, where the CPU 1305 receives a further signal from the remote control unit 105. At step 605, the method 600 proceeds to step 606 if the signal received by the CPU 1305 represents selection of the central button 405 of the remote control unit 105. This signal represents that the user wishes to view the television program represented by the current pivot program 201. Otherwise, the signal received by the CPU 1305, again, represents the selection of one of the satellite regions (e.g., 202) and the method 600 returns to step 603.

At step 606, the CPU 1305 tunes the television set 112 to a channel which is currently broadcasting the television program represented by the current pivot program 201. For example, the CPU 1305 may transmit a signal to a tuner configured within the television set 112, via the communications cable 104, in order to tune the television set 112 to the channel. Alternatively, the CPU 1305 may execute other control events, at step 606, such as scheduling the television program represented by the current pivot program 201 for recording. At the next step 607, the user interface 110 is hidden (i.e., reduced or removed from display) and the method 600 concludes.

The method 600 has been described above with reference to the user interface 110. Alternatively, the user interfaces 510 and 520 or any other arrangement of the user interface 110 described herein may be used in the method 600. The method 600 will now be described in more detail below.

As described above, the memory unit 1306 contains a plurality of data items stored therein. Each of the data items corresponds to a television program that is currently being broadcast or which is due to be broadcast at some future time. Each data item may comprise a metadata set describing at least the name of a corresponding television program, broadcast details such as channel and time of broadcasting of the corresponding television program, and data values corresponding to various data attributes (e.g., genre, cast, director, awards, producer, series, cast, studio) of the corresponding television program. For any particular two data items stored in the memory unit 1306, similarities between two data items may be quantified by defining a distance metric as a function of the data attributes (i.e., metadata set) associated with each of the two data items. The distance metric may be a function of up to N-dimension, where N represents the number of distinct data attributes in the data attribute set.

Figure 8:
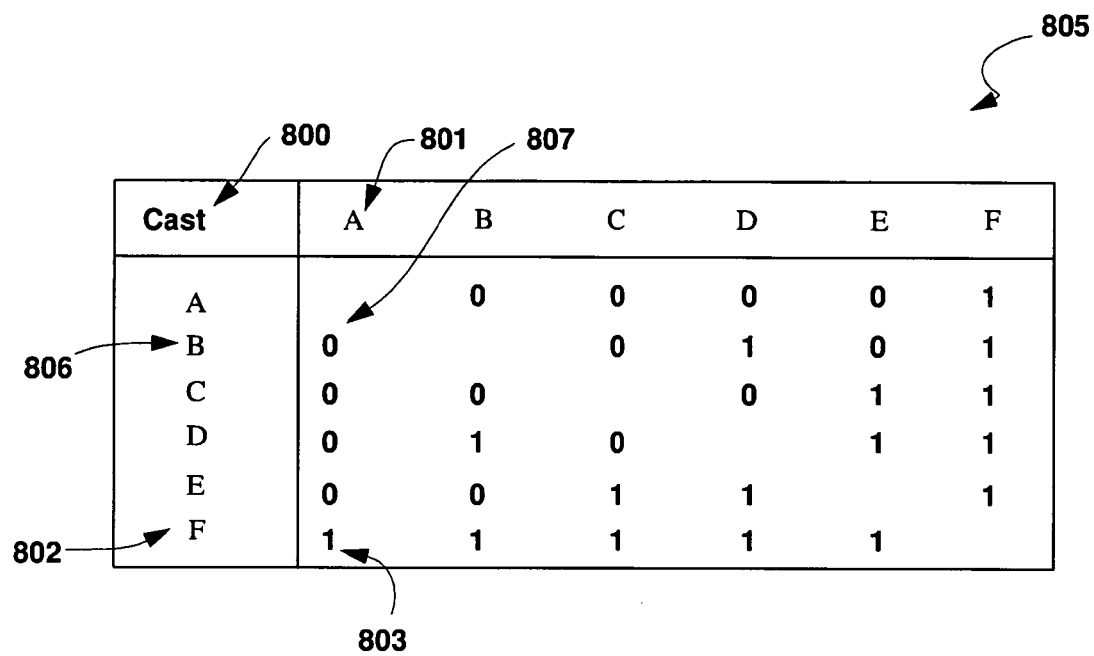
FIG. 8 shows a distance matrix for use in determining the distance between any two data items stored in the memory of the set-top-box of FIG. 1.
Figure 9:
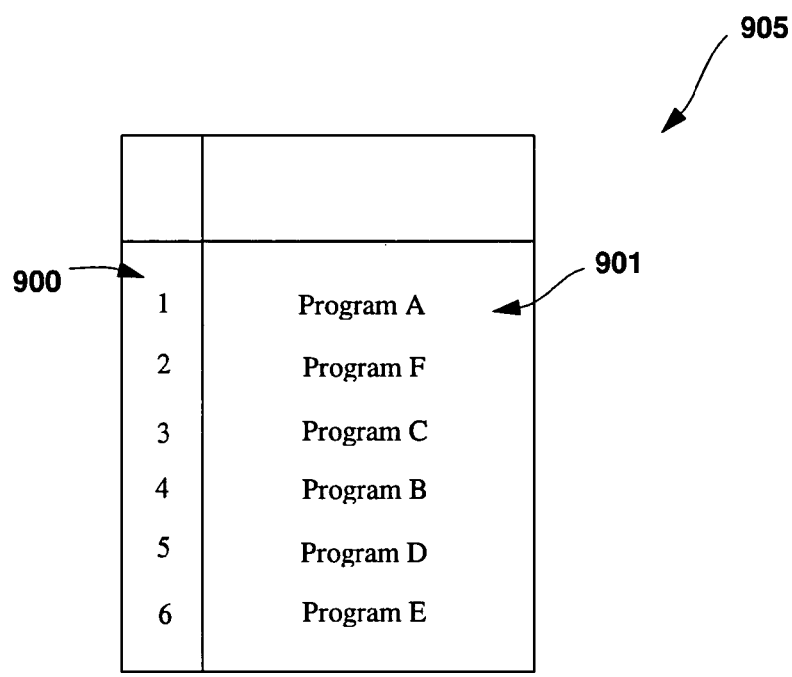
FIG. 9 shows a recommendation list comprising television program rankings and a list of television programs for recommending to a user.

FIG. 8 shows a distance matrix 805 which may be used to determine the distance between any two data items stored in memory 1306 with respect to one of the data attributes. The distance matrix 805 comprises a data attribute 800 (i.e., Cast) and data items (e.g., A 801 and F 802). These data items (e.g., A 801 and F 802) of the matrix 805 represent the data items stored in memory 1306 of the set-top-box 101. In the example of FIG. 8, each of the data items (e.g., A 801 and F 802) of the distance matrix 800 corresponds to a television program that is currently being broadcast or which is due to be broadcast at some future time. The distance matrix 805 also comprises distance values (e.g., 803) representing the distance between any two of the data items (e.g., A 801 and F 802) with respect to a data attribute (e.g., 800). For example, the distance value 803 representing the distance between the data items A 801 and F 802 may be determined based on similarities between the values of the data attribute 800 associated with each of the data items A 801 and F 802. In the example of FIG. 8, the attribute associated with the data items A 801 and F 802 being considered is the attribute 'Cast' 800. In the example of FIG. 8, any two data items (e.g., 806 and 801) in the distance matrix 800 have an associated distance value 807 of zero for the attribute 800 if the television programs represented by the two data items 806 and 801 have the same value(s) for the Cast attribute 800. That is, the cast of both of the television programs represented by the two data items 801 and 806 is the same. In contrast, the distance value 803 is equal to one if the two data items 801 and 802 have different value(s) for the Cast attribute 800.

Figure 10:
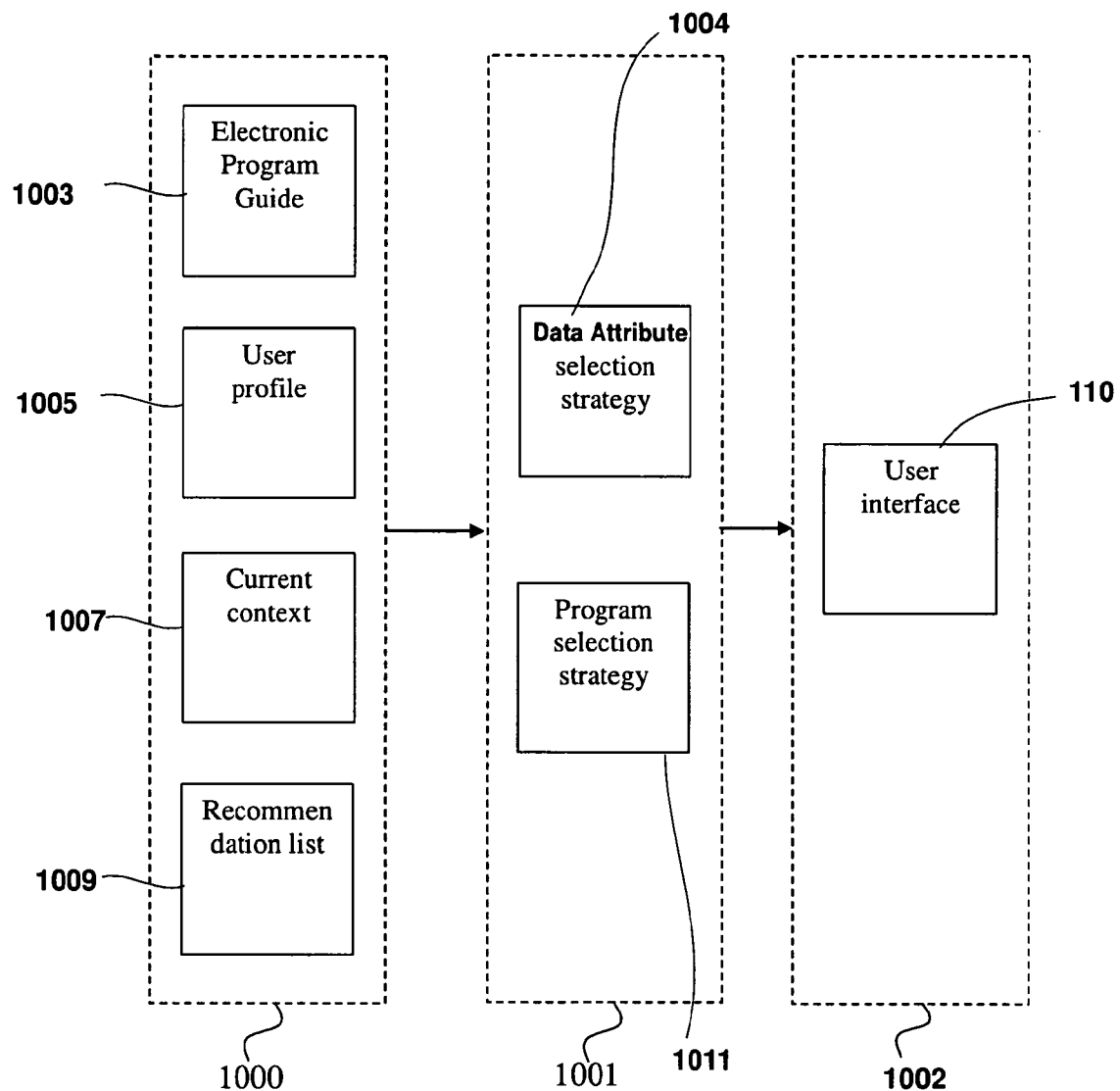
FIG. 10 is a diagram showing logical components of software for implementing methods described herein.

Software implementing the methods described herein may be broken down into three logical components, including a data component 1000, a processing component 1001, and a user interface component 1002, as seen in FIG. 10. The data component 1000 comprises an electronic program guide 1003 listing television program data, a user profile 1005 comprising user data and a recommendation list 1009 comprising user specific television program recommendations. The data component 1000 may also comprise a current context 1007 which contains such data as the television program currently being watched, the currently selected television program and the sequence of television programs selected in the current browsing session.

The processing component 1001 uses data from the data component 1000 to determine a set of television program recommendations for displaying on the television 112. The processing component 1001 may be configured according to a data attribute selection strategy 1004 that determines a set of appropriate data attributes, and a program selection strategy 1011 that determines a program recommendation for each of the data attributes. The user interface component 1002 displays the television program recommendations on the television set 112 in accordance with any one of the arrangements of the user interface 110, 510 and 520 described above, for example.

The methods described herein operate within a program space. In one example, the program space comprises television programs that are currently being broadcast and those television programs to be broadcast in the near future. Alternatively, the program space may comprise television programs that are currently being broadcast and all future programs. In still another example, the program space comprises all television programs in an electronic program guide stored in memory 1306. In still another example, the program space comprises only television programs that are currently being broadcast.

Figure 11:
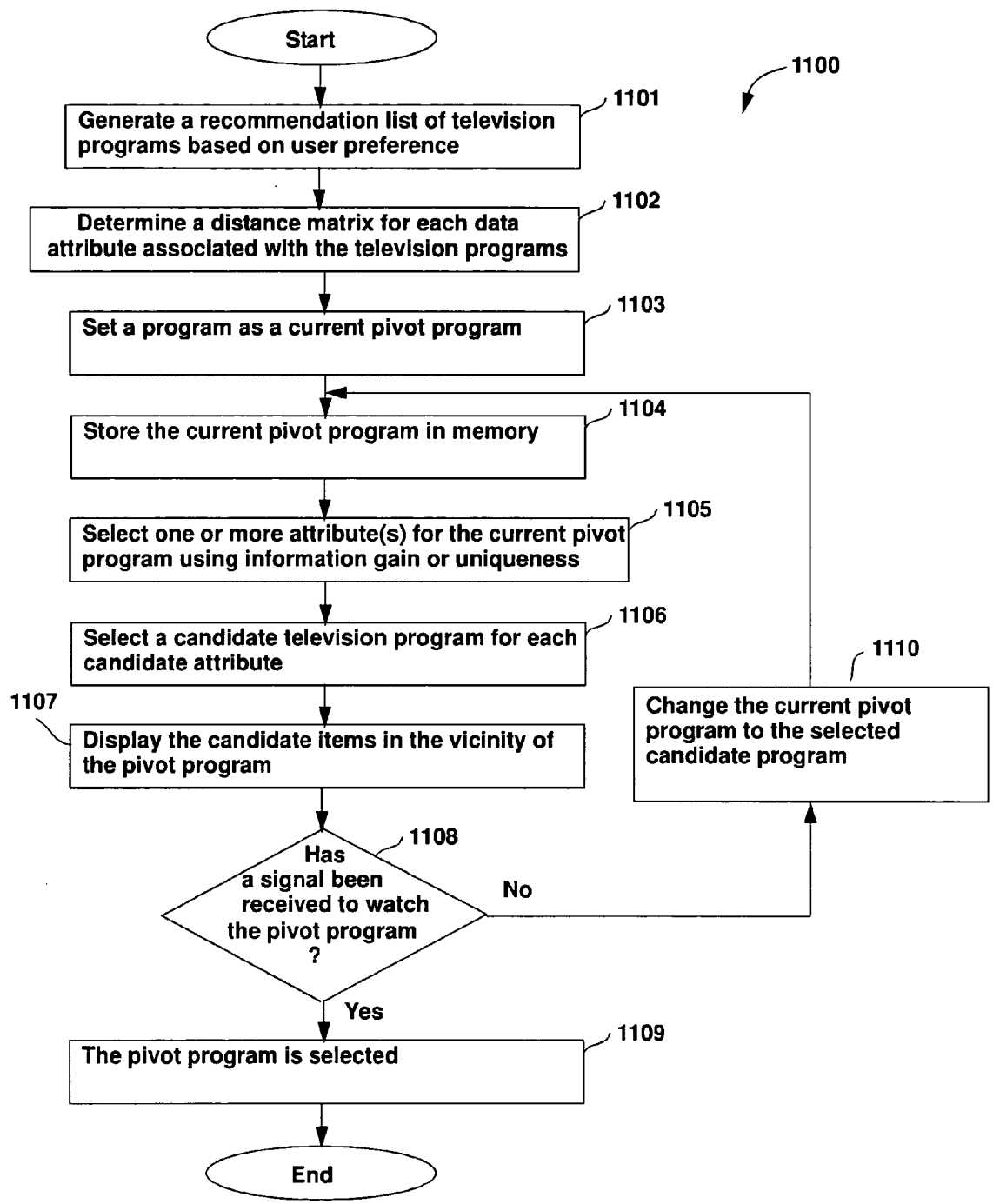
FIG. 11 is a flow diagram showing a method of selecting a television program using the remote control unit of FIG. 4A and the user interface of FIG. 4B.

FIG. 11 is a flow diagram showing a method 1100 of selecting a television program using the remote control unit of FIG. 4A and the user interface of FIG. 4B. Either of the user interfaces 510 or 520 may also be used in the method 1100. The method 1100 may be implemented as software resident in memory 1306 of the set-top-box 101 and being controlled in its execution by the CPU 1305. Again, the period of execution of the method 1100 between the beginning of step 1101 and the completion of step 1109, as described below, will be referred to as a "browsing session." The method 1100 may be executed in any one of the program spaces described above.

The method 1100 begins at the first step 1101, where the CPU 1305 generates the television program recommendation list 1009 for recommending one or more television programs to a user of the system 100 based on the user's preferences. The recommendation list 1009 may be generated at step 1101, in accordance with any suitable recommendation system, including but not limited to machine learning algorithms.

In one example, the television program recommendation list 1009 may be generated dynamically at the start of a browsing session. Alternatively, the television program recommendation list 1009 may be generated periodically and stored in memory 1306. In this instance, at the start of the browsing session, the television program recommendation list 1009 may be retrieved from memory 1306.

At the next step 1102 of the method 1100, the CPU 1305 determines a distance matrix (e.g., the matrix 800) for each data attribute associated with the television programs of the television program recommendation list 1009. The distance matrices determined at step 1102 may be configured as a set of mathematical functions that map any two television programs of the recommendation list 1009 to a distance of either zero (0) or one (1), in accordance with Formula (1) below: dist a .function. (v a .function. (p), v a .function. (q))= {1 if .times. .times. v a .function. (p)=v a .function. (q) 0 otherwise (1) ##EQU1## where p and q represent the two television programs, and v.sub.a(p) and v.sub.a(q) represent the values of an attribute a associated with each of the programs p and q, respectively.

Alternatively, the distance matrices determined at step 1102 may be configured as a set of mathematical functions that map any two television programs of the recommendation list 1009 to a distance of some numerical value. For example, for two television programs with numerical attribute values, the distance between the two television programs may be the absolute difference between the attribute values associated with the two television programs.

The distance matrices determined at step 1102 may be determined for any two television programs in the particular program space in which the method 1100 is being executed. In this instance, the distance matrices may be stored in memory 1306 and may be retrieved from memory 1306 at the beginning of a browsing session. Alternatively, the distance matrices determined at step 1102 may be determined as needed by the method 1100.

The method 1100 continues at the next step 1103, where the CPU 1305 selects a television program and sets the selected television program as a current pivot program 201. The television program selected at step 1103 may be the television program that is currently being viewed. Alternatively, the television program selected at step 1103 may be a television program that the user had previously selected from the electronic program guide 1003 configured within memory 1306. The television program selected at step 1103 may also be a most highly recommended television program of the television program recommendation list 1109 generated at step 1101.

At the next step 1104 of the method 1100, the name (or a unique identifier representing the name) of the television program selected as the current pivot program 201 at step 1103 is stored in memory 1306 as data for the current context. Storing the current pivot program 201 allows back tracking through a navigation path of the current browsing session. However, if back tracking is not required, then the current pivot program 201 does not need to be stored. The name of the current pivot program 201 may also be displayed on the television set 112, at step 1104, in the region 200 in accordance with the user interface 110 of FIG. 4B.

Then at the next step 1105 of the method 1100, the CPU 1305 selects one or more data attributes associated with the current pivot program 201 as candidate attributes. The data attributes selected at step 1105 constitute a set of search conditions. The selected data attributes may be used for selecting television program options for navigating the data items stored in memory 1306. In the example described herein, up to four data attributes may be selected dynamically at step 1105 based on the following predetermined criteria: [0103] (i) the current pivot program; and [0104] (ii) the availability of television programs to recommend for the selected candidate data attributes using either (a) information gain or (b) uniqueness, as will be described in detail below.

In this instance, the term dynamically refers to the substantially automatic selection of the data attributes performed by the CPU 105 at step 1105. The data attributes are selected at step 1105 upon execution of the method 1100 and no user input is required to select the data attributes. Alternatively, user input may be used to select the data attributes at step 1105.

The data attributes selected at step 1105 are unique whenever possible. In this instance, the selected data attributes may also be repeated for the pivot program 201 due to poor metadata availability or other criteria as will be described below.

An example of poor metadata is a lack of available attribute values being associated with the current pivot program 201, such that the number of usable data attributes is less than a predetermined number. This predetermined number may be four (4) in the arrangement of FIGS. 2, 3, 4B, 5B and 5C.

As described above, the data attributes selected at step 1105 may alternatively be selected using information gain. Information gain for a data attribute is a numerical value that quantifies how useful the data attribute is in determining which television program has previously been viewed or not viewed by a user of the system 100. The information gain I for an attribute a and a classification w may be determined in accordance with Formula (2) below: I a=H w−(i=1 n .times. .times. (Pv ai .times. H<w .times. .times. v ai>)) (2) ##EQU2## where w represents a watched classification such that a television program classified as watched has been determined by the television system 100 as having been viewed previously by a user of the system 100. For example, the television system 100 may use certain statistics to determine if a television program has been previously viewed or not by the user. H.sub.w represents entropy for the classification w, n represents the total number of distinct values for the attribute a, v.sub.ai represents one value in a set of all distinct values for the attribute a, Pv.sub.ai represents the probability of a television program having a value of v.sub.ai for the attribute a, and H.sub.<w/v.sub.ai> represents entropy for the classification w given that attribute a has a value v.sub.ai.

The entropy H for the classification w may be determined in accordance with Formula (3) below: H.sub.w=−P.sub.w log(P.sub.w) (3) where P.sub.w represents the probability of a television program having the classification w. The entropy H for the classification w given that attribute a has a value v.sub.ai may be determined in accordance with Formula (4) below: H.sub.<w/v.sub.ai>=−(P.sub.w|v.sub.ai)log (P.sub.w|v.sub.ai) (4) As described herein, information gain Ia for an attribute a of each television program having a corresponding data item stored in memory 1306 is determined from the past viewing behaviour of the user of the system 100. A value for information gain Ia may be determined for each data attribute a stored in memory 1306 according to Formula (2). The attributes may then be sorted according to the determined information gain Ia for each attribute a. All of the sorted data attributes for which the current pivot program 201 does not have a corresponding value may then be discarded and the attributes having the highest corresponding value for information gain Ia may be selected as the attributes at step 1105.

As described above, the selected data attributes may be repeated for the pivot program 201 due to poor metadata availability or other criteria. For example, a decision on whether a selected attribute is required to be repeated may be made based on any combination of the following criteria: [0110] a) a predetermined threshold on information gain I [0111] b) the difference in information gain I between a first attribute and a second attribute; and [0112] c) the number of attributes available for the pivot program 201.

For criteria a) directly above, the predetermined threshold may be defined before the start of a browsing session (i.e., prior to the execution of the method 1100). When the information gain Ia for an attribute a falls below the predetermined threshold, then the attribute a is not repeated. This predetermined threshold may be set to half way between a minimum and maximum information gain I for the browsing session.

For criteria b) above, if the difference in information gain I between a first attribute and second data attribute is large, then the first attribute is used much more often than the second attribute to determine which television program has been watched. In this instance, the first attribute is repeated instead of selecting the second attribute.

For criteria c) above, if the number of attributes available for the current pivot program 201 is less than a number of required data attributes, then data attributes may be repeated. In the arrangement of FIGS. 2, 3, 4B, 5B and 5C, the data attributes may be repeated if the number of attributes available for the current pivot program 201 is less than four (4) data attributes. The data attributes may be selected at step 1105 using uniqueness. Uniqueness for a data attribute is a numerical value quantifying how unique the value of an attribute of the pivot program 201 is in a current program space. Uniqueness U(a) for an attribute a of current pivot program c with value v over a program space P with |P| programs may be determined in accordance with Formula (5) below: $U_c(a)=1-(\Sigma_{p \epsilon P} dist_a(v_a(p), v_a(f)))/|P|$ (5) where $dist_a(v_a(p), v_a(f))$ is a function for determining the distance between two attribute values $v_a(p)$ and $v_a(f)$ as described above with reference to Formula (1), and |P| represents the number of television programs in the program space P.

A method 1400 of selecting one or more data attributes associated with the current pivot program 201 using uniqueness for use as candidate attributes, as executed at step 1105, will now be described. The method 1400 may be implemented as software resident in memory 1306 of the set-top-box 101 and being controlled in its execution by the CPU 1305.

The method 1400 begins at the first step 1401, where the CPU 1305 determines the uniqueness $U_c(a)$ of the data attributes associated with the pivot program 201, in accordance with Formula (5) above. Then at the next step 1403, the CPU 1305 discards all unique data attributes where $U_c(a)=1$. At the next step 1405, the remaining data attributes associated with the current pivot program 201 (i.e., those attributes not discarded at step 1403) are sorted according to their uniqueness. The method 1400 concludes at the next step 1407, where the CPU 1305 selects one or more of the sorted data attributes associated with the pivot program 201 for use as candidate attributes. The data attributes that have the highest uniqueness are selected as candidate attributes at step 1407. If two data attributes have the same uniqueness, then the data attribute with a higher information gain may be selected at step 1407. If two data attributes have the same information gain, then one of the data attributes may be selected randomly as a candidate attribute at step 1407.

Apart from automatically selecting data attributes information gain and uniqueness, as described above, user input may be utilised to select the data attributes at step 1105 of FIG. 11. In one example, one or more data attributes may be selected by the user of the system 100, for use as candidate attributes, before a browsing session. In this instance, the selected data attributes do not change during the course of a browsing session. Alternatively, one or more data attributes may be selected by a designer of the system 100, for use as candidate attributes, during development of the system 100. Again, in this instance, the selected data attributes do not change during the course of a browsing session.

The method 1100 continues at the next step 1106, where the CPU 1305 selects a candidate television program for each of the candidate attributes selected at step 1105. The candidate television programs are selected from the television program recommendation list 1009 generated at step 1101 using the distance matrices determine at step 1102. A candidate television program may be selected for a particular candidate attribute at step 1106 if the candidate television program meets the following criteria: [0120] a) the selected candidate television program has never been a pivot program previously in the current browsing session; and [0121] b) the value of the particular candidate attribute for the candidate television program is equal to the value of a corresponding attribute associated with the pivot program 201; and [0122] c) the selected candidate television program has the highest recommendation rating among those television programs selected in b) directly above.

If more than one television program has an equally high recommendation rating and the same attribute value for the attribute corresponding to the candidate attribute, then the television program that is "closest" to the current pivot program 201 is selected. In this instance, the "closeness" may be determined according to Formula (6) below: $a \times (dist_a(v_a(p), v_a(c)) \times dist_a(v_a(p), v_a(c)))$ (6) ##EQU3## where $dist_a(v_a(p), v_a(c))$ is the determined in accordance with Formula (1) above for determining the distance between two attribute values $v_a(p)$ and $v_a(c)$. If no television program satisfies the selection criteria a), b) and c) directly above, for a particular candidate attribute then the particular candidate attribute is replaced with a next one of the candidate attributes selected at step 1105.

In addition to having equal attribute values for a particular candidate attribute, television programs with attribute values similar to that of the current pivot program 201 for the particular candidate attribute may also be considered as candidate television programs. Two attribute values may be considered similar if the distance between the two attribute values is lower than a predetermined threshold distance. The predetermined threshold distance may be set to half way between a minimum and maximum distance value.

As described above, the selection of the one or more data attributes at step 1105 and the selection of the candidate attributes at step 1106, are executed by the CPU 1305. Alternatively, steps 1105 and 1106 may be executed by different CPUs where each of the CPUs is configured within the set top box 101 or where one or both of the CPU are configured externally to the set top box.

The method 1100 continues at the next step 1107, where the candidate television programs and their associated attributes are displayed on the television set 112 in the vicinity of the pivot program 201, in accordance with the user interface 110 of FIG. 4B. As seen in FIG. 4B, the current pivot program 201 set at step 1103 is displayed in the centre region 200 of the user interface 110, and the four candidate television programs selected at step 1106 are displayed in the satellite regions 202, 205, 208 and 211 together with corresponding candidate attributes 204, 207, 210 and 213, respectively. Alternatively, any of the user interfaces 110, 510 or 520 or any other suitable configuration of the user interface may be used to present the pivot program 201 and candidate television programs and attributes, to the user of the system 100.

At the next step 1108, if a signal is received by the CPU 1305 representing selection of the central button 405 of the remote control unit 105, then the method 1100 proceeds to step 1109. This signal represents that the user wishes to view, record or have some other action performed on the television program represented by the pivot program 201. Otherwise, the signal received from the CPU 1305 at step 1108 represents the selection of one of the satellite regions (e.g., 202) of the user interface 110 displayed at step 1107 and the method 1100 proceeds to step 1110.

At step 1109, the current pivot program 201 is selected and the method 1100 and therefore the browsing session concludes. The CPU 1305 may then tune the television set 112 to a channel if the television program represented by the pivot program 201 is currently being broadcast, as described above. If the current pivot program 201 represents a television program to be broadcast in the future, the television system 100 may seek input from a user as to whether the television program is to be recorded or whether a reminder is to be generated to alert the user when the television program is being broadcast.

At step 1110, the current pivot program 201 is replaced with the candidate television program represented by the satellite region (e.g., 202) selected by the user at step 1108. Following step 1110, the method 1100 returns to step 1104 where the current pivot program 201 is stored in memory 1306. Steps 1104 to 1110 may then be repeated until the CPU 1305 receives a signal 109 representing selection of the central button 405 of the remote control unit 105 and therefore selection of the current pivot program 201.

In each repeat of step 1105, a new set of selected candidate attributes may be different to a previous set of selected candidate attributes. In this instance, the new set of selected candidate attributes constitute a new set of searching conditions.

Following selection of the candidate television programs for each of the candidate attributes, at step 1106, an additional candidate television program may be selected from memory 1306 by the CPU 1305. In one example, the additional candidate television program may be selected for being dissimilar to the current pivot program 201 set at step 1103 of the method 1100. The additional candidate television program may be displayed in the region 301 of the user interface 110, at step 1107 of the method 1100. The additional candidate television program may be the most highly recommended television program that is dissimilar to the pivot program 201. In still another example, the additional candidate television program may be a randomly selected television program that is dissimilar to the pivot program 201 set at step 1103.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

The foregoing describes only some embodiments of the present invention, and modifications and/or changes can be made thereto without departing from the scope and spirit of the invention, the embodiments being illustrative and not restrictive.

What is claimed is:

1. A program selecting apparatus for selecting a broadcast program, the program selecting apparatus comprising:
   an instruction receiver configured to receive user instructions to operate a graphical user interface displayed on a display unit; and
   a controller configured to generate the graphical user interface to be displayed on the display unit together with a video of a first program that is being displayed, the graphical user interface including a first area, a plurality of second areas arranged in an outer part of the first area, and a plurality of third areas arranged in the outer part of the first area, each of the plurality of second areas of the graphical user interface being selectable by the instruction receiver,
   wherein the controller generates the graphical user interface such that a program title of the first program is displayed in the first area, and a plurality of program titles of a plurality of second programs is displayed in the plurality of second areas together with the program title of the first program displayed in the first area, a plurality of attribute names corresponding to the plurality of the second programs is displayed in the plurality of third areas together with the program title of the first program displayed in the first area and the plurality of program titles of the plurality of second programs displayed in the plurality of second areas, each of the plurality of attribute names corresponding to the plurality of the second programs shares a common program attribute with the first program, the plurality of attribute names corresponding to the plurality of the second programs being different from each other, and
   wherein, in response to a second program being selected from the plurality of second programs displayed in the plurality of second areas, the controller generates the graphical user interface such that the program title of the selected second program is displayed in the first area, and a plurality of program titles of a plurality of third programs is displayed in the plurality of second areas together with the program title of the selected second program displayed in the first area, and a further plurality of attribute names corresponding to the plurality of the third programs is displayed in the plurality of third areas, together with the program title of the selected second program displayed in the first area and the plurality of program titles of the plurality of third programs displayed in the plurality of second areas, and each of the further plurality of attribute names corresponding to the plurality of the third programs shares a common program attribute with the selected second program, the further plurality of attribute names corresponding to the plurality of the third programs being different from each other.

2. The apparatus according to claim 1, wherein the plurality of second areas are four areas arranged in an up direction, a down direction, a left direction, and a right direction from the first area, respectively.

3. The apparatus according to claim 1,
   wherein the instruction receiver is a remote control having an up directional button, a down directional button, a left directional button, and a right directional button, and
   wherein, in response to one of the directional buttons being selected, one program is selected from among the plurality of programs corresponding to the plurality of second areas.

4. The apparatus according to claim 1, wherein the plurality of attribute names includes at least either one of: information relating to a program genre, information relating to an actor or actress; and information relating to a keyword.

5. The apparatus according to claim 1, wherein the graphical user interface is overlaid on a part of the video of the first program that is being displayed.

6. A method of controlling a program selecting apparatus comprising steps of:
   receiving user instructions to operate a graphical user interface displayed on a display unit; and
   generating the graphical user interface to be displayed on the display unit together with a video of a first program that is being displayed, the graphical user interface including a first area, a plurality of second areas arranged in an outer part of the first area, and a plurality of third areas arranged in the outer part of the first area, each of the plurality of second areas of the graphical user interface being selectable in the receiving step,
   wherein the generating step includes:
      displaying a program title of the first program in the first area;

displaying a plurality of program titles of a plurality of second programs in the plurality of second areas together with the program title of the first program displayed in the first area; and displaying a plurality of attribute names corresponding to the plurality of the second programs in the plurality of third areas together with the program title of the first program displayed in the first area and the plurality of program titles of the plurality of second programs displayed in the plurality of second areas, each of the plurality of attribute names corresponding to the plurality of the second programs shares a common program attribute with the first program, the plurality of attribute names corresponding to the plurality of the second programs being different from each other, and wherein, in response to a second program being selected from the plurality of second programs displayed in the plurality of second areas, the generating step further includes:

displaying the program title of the selected second program in the first area;

displaying a plurality of program titles of a plurality of third programs in the plurality of second areas together with the program title of the selected second program displayed in the first area; and displaying a further plurality of attribute names corresponding to the plurality of the third programs in the plurality of third areas, together with the program title of the selected second program displayed in the first area and the plurality of program titles of the plurality of third programs displayed in the plurality of second areas, and each of the further plurality of attribute names corresponding to the plurality of the third programs shares a common program attribute with the selected second program, the further plurality of attribute names corresponding to the plurality of the third programs being different from each other.

7. The method according to claim 6, further comprising arranging the plurality of second areas in an up direction, a down direction, a left direction, and a right direction from the first area, respectively.

8. The method according to claim 6, wherein, in response to a directional button being selected from among an up directional button, a down directional button, a left directional button, and a right directional button of a remote control, selecting one program from among the plurality of programs corresponding to the plurality of second areas.

9. The method according to claim 6, wherein the plurality of attribute names includes at least either one of: information relating to a program genre, information relating to an actor or actress; and information relating to a keyword.

10. The method according to claim 6, further comprising overlaying the graphical user interface is on a part of the video of the first program that is being displayed.

11. A program selecting apparatus for selecting a broadcast program, the program selecting apparatus comprising:

an instruction means for receiving user instructions to operate a graphical user interface displayed on a display means; and a control means for generating the graphical user interface to be displayed on the display means together with a video of a first program that is being displayed, the graphical user interface including a first area, a plurality of second areas arranged in an outer part of the first area, and a plurality of third areas arranged in the outer part of the first area, each of the plurality of second areas of the graphical user interface being selectable by the instruction means, wherein the control means generates the graphical user interface such that a program title of the first program is displayed in the first area, and a plurality of program titles of a plurality of second programs is displayed in the plurality of second areas together with the program title of the first program displayed in the first area, a plurality of attribute names corresponding to the plurality of the second programs is displayed in the plurality of third areas together with the program title of the first program displayed in the first area and the plurality of program titles of the plurality of second programs displayed in the plurality of second areas, each of the plurality of attribute names corresponding to the plurality of the second programs shares a common program attribute with the first program, the plurality of attribute names corresponding to the plurality of the second programs being different from each other, and wherein, in response to a second program being selected from the plurality of second programs displayed in the plurality of second areas, the control means generates the graphical user interface such that the program title of the selected second program is displayed in the first area, and a plurality of program titles of a plurality of third programs is displayed in the plurality of second areas together with the program title of the selected second program displayed in the first area, and a further plurality of attribute names corresponding to the plurality of the third programs is displayed in the plurality of third areas, together with the program title of the selected second program displayed in the first area and the plurality of program titles of the plurality of third programs displayed in the plurality of second areas, and each of the further plurality of attribute names corresponding to the plurality of the third programs shares a common program attribute with the selected second program, the further plurality of attribute names corresponding to the plurality of the third programs being different from each other.

12. The apparatus according to claim 11, wherein the plurality of second areas are four areas arranged in an up direction, a down direction, a left direction, and a right direction from the first area, respectively.

13. The apparatus according to claim 11, wherein the instruction means is a remote control having an up directional button, a down directional button, a left directional button, and a right directional button, and wherein, in response to one of the directional buttons being selected, one program is selected from among the plurality of programs corresponding to the plurality of second areas.

14. The apparatus according to claim 11, wherein the plurality of attribute names includes at least one of: information relating to a program genre, information relating to an actor or actress, and information relating to a keyword.

15. The apparatus according to claim 11, wherein the graphical user interface is overlaid on a part of the video of the first program that is being displayed.

16. A video content selecting apparatus for selecting a video content, the video content selecting apparatus comprising:

an instruction receiver configured to receive user instructions to operate a graphical user interface displayed on a display unit; and a controller configured to generate the graphical user interface to be displayed on the display unit together with a video of a first video content that is being displayed, the graphical user interface including a first area, a plurality of second areas arranged in an outer part of the first area, and a plurality of third areas arranged in the outer part of the first area, each of the plurality of second areas of the graphical user interface being selectable by the instruction receiver, wherein the controller generates the graphical user interface such that a video content title of the first video content is displayed in the first area, and a plurality of video content titles of a plurality of second video contents is displayed in the plurality of second areas together with the video content title of the first video content displayed in the first area, a plurality of attribute names corresponding to the plurality of the second video contents is displayed in the plurality of third areas together with the video content title of the first video content displayed in the first area and the plurality of video content titles of the plurality of second video contents displayed in the plurality of second areas, each of the plurality of attribute names corresponding to the plurality of the second video contents shares a common video content attribute with the first video content, the plurality of attribute names corresponding to the plurality of the second video contents being different from each other, and wherein, in response to a second video content being selected from the plurality of second video contents displayed in the plurality of second areas, the controller generates the graphical user interface such that the video content title of the selected second video content is displayed in the first area, and a plurality of video content titles of a plurality of third video contents is displayed in the plurality of second areas together with the video content title of the selected second video content displayed in the first area, and a further plurality of attribute names corresponding to the plurality of the third video contents is displayed in the plurality of third areas, together with the video content title of the selected second video content displayed in the first area and the plurality of video content titles of the plurality of third video contents displayed in the plurality of second areas, and each of the further plurality of attribute names corresponding to the plurality of the third video contents shares a common video content attribute with the selected second video content, the further plurality of attribute names corresponding to the plurality of the third video contents being different from each other.

17. A method of controlling a video content selecting apparatus comprising steps of:

receiving user instructions to operate a graphical user interface displayed on a display unit; and generating the graphical user interface to be displayed on the display unit together with a video of a first video content that is being displayed, the graphical user interface including a first area, a plurality of second areas arranged in an outer part of the first area, and a plurality of third areas arranged in the outer part of the first area, each of the plurality of second areas of the graphical user interface being selectable in the receiving step, wherein the generating step includes:

displaying a video content title of the first video content in the first area;

displaying a plurality of video content titles of a plurality of second video contents in the plurality of second areas together with the video content title of the first video content displayed in the first area; and displaying a plurality of attribute names corresponding to the plurality of the second video contents in the plurality of third areas together with the video content title of the first video content displayed in the first area and the plurality of video content titles of the plurality of second video contents displayed in the plurality of second areas, each of the plurality of attribute names corresponding to the plurality of the second video contents shares a common video content attribute with the first video content, the plurality of attribute names corresponding to the plurality of the second video contents being different from each other, and wherein, in response to a second video content being selected from the plurality of second video contents displayed in the plurality of second areas, the generating step further includes:

displaying the video content title of the selected second video content in the first area;

displaying a plurality of video content titles of a plurality of third video contents in the plurality of second areas together with the video content title of the selected second video content displayed in the first area; and displaying a further plurality of attribute names corresponding to the plurality of the third video contents in the plurality of third areas, together with the video content title of the selected second video content displayed in the first area and the plurality of video content titles of the plurality of third video contents displayed in the plurality of second areas, and each of the further plurality of attribute names corresponding to the plurality of the third video contents shares a common video content attribute with the selected second video content, the further plurality of attribute names corresponding to the plurality of the third video contents being different from each other.

18. A video content selecting apparatus for selecting a broadcast video content, the video content selecting apparatus comprising:

an instruction means for receiving user instructions to operate a graphical user interface displayed on a display means; and a control means for generating the graphical user interface to be displayed on the display means together with a video of a first video content that is being displayed, the graphical user interface including a first area, a plurality of second areas arranged in an outer part of the first area, and a plurality of third areas arranged in the outer part of the first area, each of the plurality of second areas of the graphical user interface being selectable by the instruction means, wherein the control means generates the graphical user interface such that a video content title of the first video content is displayed in the first area, and a plurality of video content titles of a plurality of second video contents is displayed in the plurality of second areas together with the video content title of the first video content displayed in the first area, a plurality of attribute names corresponding to the plurality of the second video contents is displayed in the plurality of third areas together with the video content title of the first video content displayed in the first area and the plurality of video content titles of the plurality of second video contents displayed in the plurality of second areas, each of the plurality of attribute names corresponding to the plurality of the second video contents shares a common video content attribute with the first video content, the plurality of attribute names corresponding to the plurality of the second video contents being different from each other, and wherein, in response to a second video content being selected from the plurality of second video contents displayed in the plurality of second areas, the control means generates the graphical user interface such that the video content title of the selected second video content is displayed in the first area, and a plurality of video content titles of a plurality of third video contents is displayed in the plurality of second areas together with the video content title of the selected second video content displayed in the first area, and a further plurality of attribute names corresponding to the plurality of the third video contents is displayed in the plurality of third areas, together with the video content title of the selected second video content displayed in the first area and the plurality of video content titles of the plurality of third video contents displayed in the plurality of second areas, and each of the further plurality of attribute names corresponding to the plurality of the third video contents shares a common video content attribute with the selected second video content, the further plurality of attribute names corresponding to the plurality of the third video contents being different from each other.

* * * * *